United States Patent [19]

Montsinger

[11] Patent Number: 5,447,793
[45] Date of Patent: Sep. 5, 1995

[54] APPARATUS AND METHOD FOR FORMING FIBER FILLED THERMOPLASTIC COMPOSITE MATERIALS

[76] Inventor: Lawrence V. Montsinger, 1837 Kilmonack La., Charlotte, N.C. 28226

[21] Appl. No.: 4

[22] Filed: Jan. 4, 1993

Related U.S. Application Data

[63] Continuation-in-part of Ser. No. 809,221, Dec. 16, 1991, Pat. No. 5,176,775, which is a continuation of Ser. No. 424,717, Oct. 20, 1989, abandoned.

[51] Int. Cl.⁶ .............................................. B05D 1/18
[52] U.S. Cl. .................................... 428/373; 425/110; 425/112; 118/110; 118/111; 118/116; 118/117; 118/118; 118/122; 118/125; 118/419; 118/420
[58] Field of Search .............. 156/181, 166, 180, 250, 156/441, 433, 448; 264/136, 174; 428/224, 373, 425; 425/110, 112, 114; 118/122, 3, 125, 419, 420

[56] References Cited

U.S. PATENT DOCUMENTS

| | | | |
|---|---|---|---|
| 1,454,224 | 5/1923 | Schmidt | 427/435 |
| 2,730,455 | 1/1956 | Swann | 427/439.6 |
| 3,150,026 | 9/1964 | Talv | 118/405 |
| 3,154,908 | 11/1964 | Cilker et al. | |
| 3,873,389 | 3/1975 | Daniels | 156/181 |
| 3,993,726 | 11/1976 | Moyer | 264/174 |
| 4,439,387 | 3/1984 | Hawley | 425/114 X |
| 4,565,153 | 1/1986 | Corley | 118/420 X |
| 4,614,678 | 9/1986 | Ganga | 264/174 X |
| 4,720,366 | 1/1988 | Binnersley et al. | 264/174 X |
| 4,728,387 | 3/1988 | Hilakos | 118/420 |
| 4,806,298 | 2/1989 | Wilkinson et al. | 118/420 X |
| 4,894,105 | 1/1990 | Dyksterhouse et al. | 118/420 X |
| 4,957,422 | 9/1990 | Glemet et al. | 425/114 |
| 5,002,712 | 3/1991 | Goldmann et al. | 427/439.1 |
| 5,176,775 | 1/1993 | Montsinger | 156/181 |

FOREIGN PATENT DOCUMENTS

| | | | |
|---|---|---|---|
| 0102711 | 3/1984 | European Pat. Off. | 156/273.9 |
| 364829 | 4/1990 | European Pat. Off. | |
| 3521228 | 12/1986 | Germany | 156/180 |
| 371518 | 5/1939 | Italy | 427/434.4 |
| 53-1266 | 1/1978 | Japan | 264/136 |
| 895701 | 1/1982 | U.S.S.R. | 264/136 |

OTHER PUBLICATIONS

Patent Abstracts of Japan, Abstract of JP 1-16612 entitled "Manufacture of Continuous FRTP Prepreg and its Device", vol. 13, No. 193 (M-822), Jan. 20, 1989.

Primary Examiner—Patrick J. Ryan
Assistant Examiner—Richard P. Weisberger
Attorney, Agent, or Firm—Bell, Seltzer, Park & Gibson

[57] ABSTRACT

This invention relates to fiber reinforced composite materials, and to methods and apparatus for forming such materials. The apparatus includes an impregnation chamber having an elongate impregnation passageway with an entrance end and an exit end, means for supplying a polymer material to said impregnation chamber, and means for advancing continuous filament fibers into and through said impregnation chamber, entering through said entrance end and exiting through said exit end, so that the polymer material is immersed in said polymer material. Shear inducing means is mounted in said impregnation chamber and cooperates with said fibers for imparting shear to the polymer material as it contacts the advancing fibers to enhance the wetting and impregnation of the fibers by the polymer material.

7 Claims, 2 Drawing Sheets

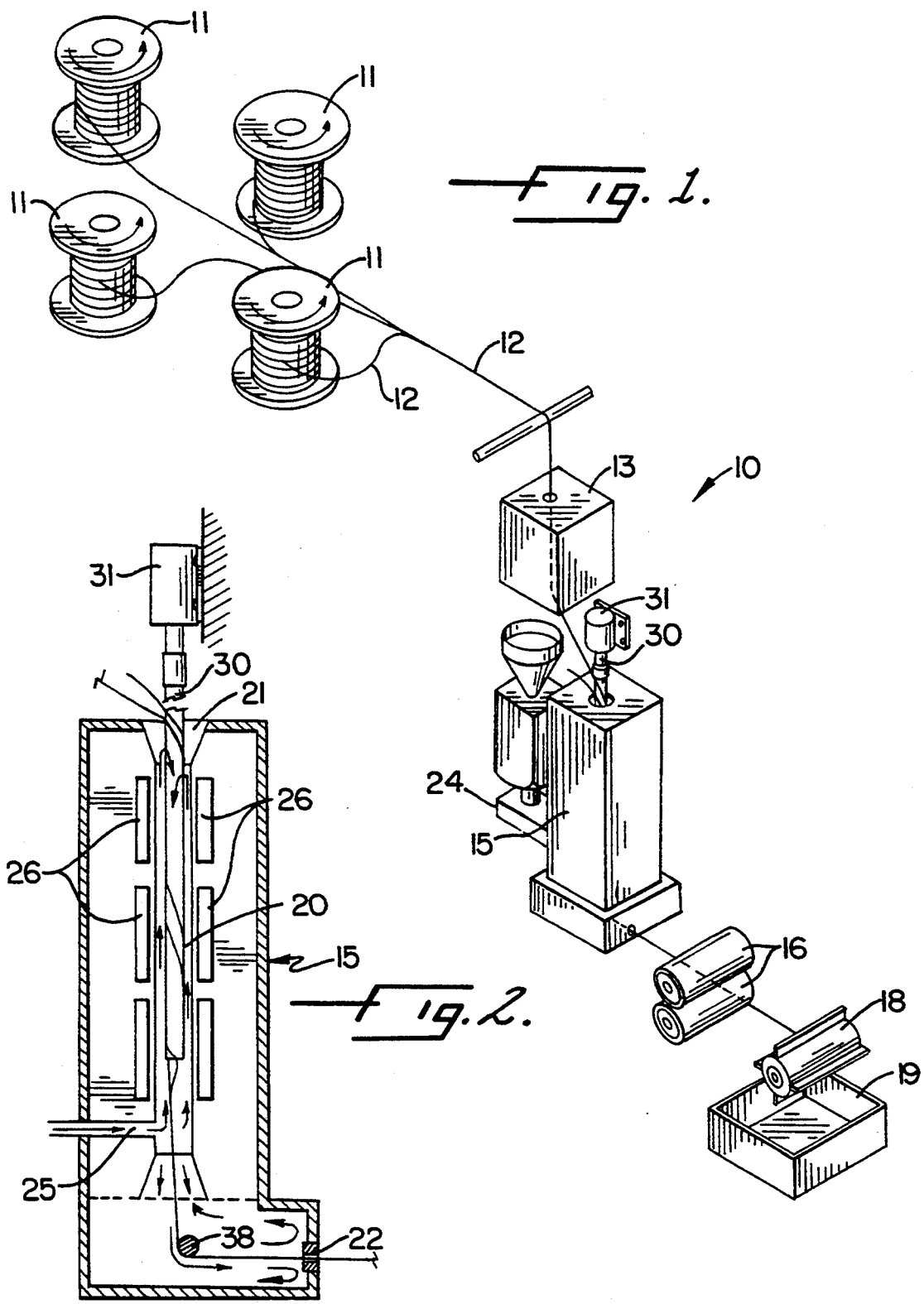

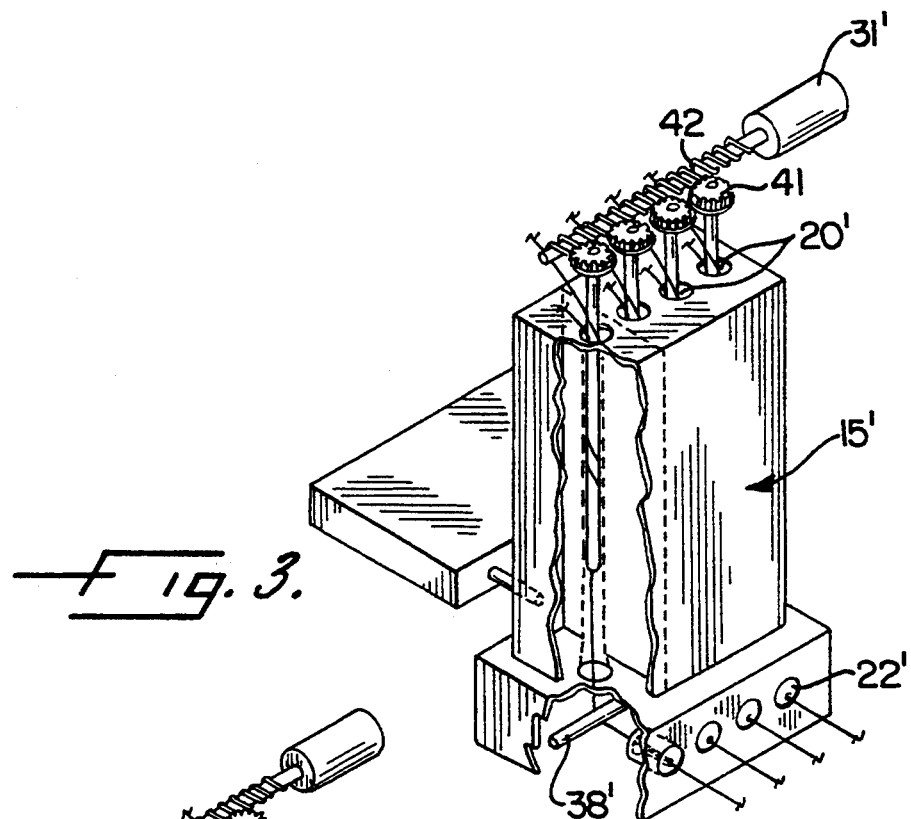
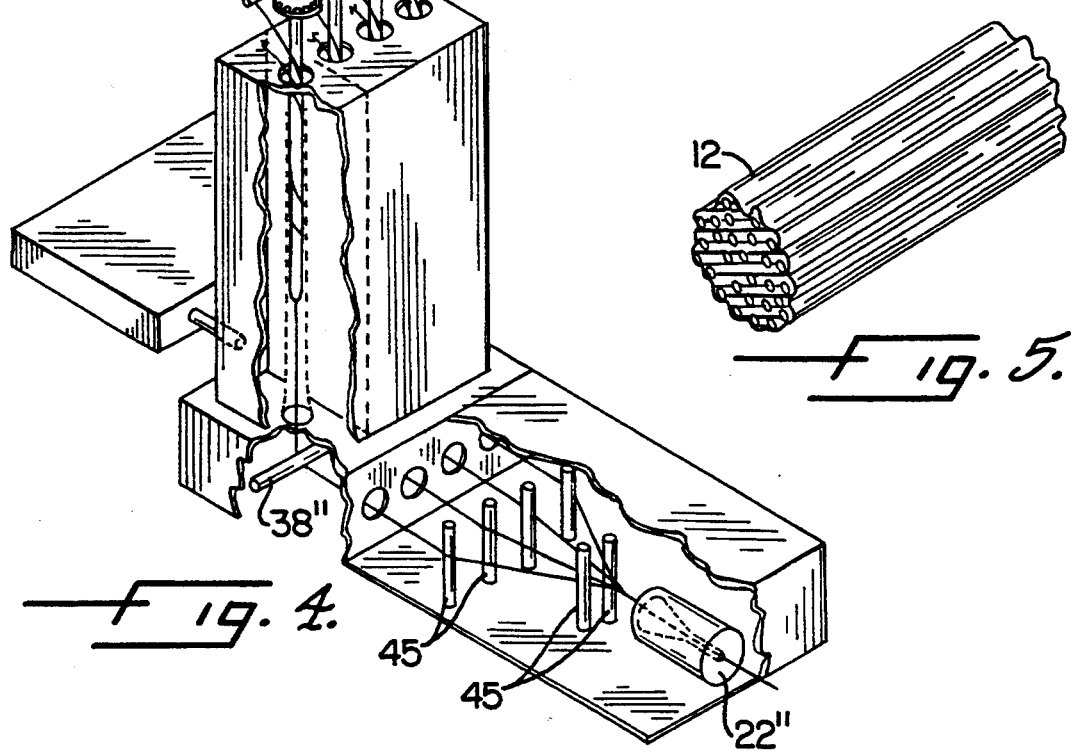

ized at 10 in FIG. 1. The
APPARATUS AND METHOD FOR FORMING FIBER FILLED THERMOPLASTIC COMPOSITE MATERIALS

CROSS-REFERENCE TO RELATED APPLICATIONS

This application is a continuation-in-part of copending application Ser. No. 07/809,221, filed Dec. 16, 1991, now U.S. Pat. No. 5,176,775, issued Jan. 5, 1993, which is a continuation of Ser. No. 07/424,717 filed Oct. 20, 1989, now abandoned.

BACK GROUND OF THE INVENTION

This invention relates to composite materials formed of thermoplastic materials reinforced by fibers. More particularly, this invention relates to such composite materials, and to methods and apparatus for forming such materials, where the thermoplastic and fiber components are such as to impart to the composite materials enhanced strength.

The forming of composite materials using polymers and fibers has been known heretofore, and apparatus, processes, and products relating to such composite materials are disclosed, for example, in Singer, U.S. Pat. No. 4,341,822; Hawley, U.S. Pat. No. 4,439,387; Cogswell, U.S. Pat. No. 4,549,920; and Cogswell, U.S. Pat. No. 4,559,262. At least certain of the mentioned disclosures describe composite materials formed using thermoplastic polymers and structural reinforcement fibers such as glass, aramids, metallic fibers or the like, and address the difficulties of obtaining penetration of polymers into the fibers and the embedding of the fibers with any body of the polymeric material. The relative penetration or the embedding, or ease of accomplishing such penetration or embedding, has been referred to heretofore (and will be here referred to) as the "wetting" of the fiber with the polymeric material.

Composite materials of the broad class identified above have been formed using both thermosetting and thermoplastic polymeric materials. The difficulties of producing composite materials with the two classes of polymeric materials differ substantially, due to the characteristics of the polymeric materials. The present invention is concerned only with the thermoplastic materials, as to which wetting has been a challenging problem with high melt viscosity thermoplastic materials. This has been a limiting factor of the strength obtainable by such materials, as stronger thermoplastics typically also have higher viscosities.

The above-noted parent application discloses a process and apparatus which increased the wetting of the fibers with molten thermoplastic polymer by advancing fibers in a counter-current manner through the molten polymer. Shear forces thus induced in the polymer decrease the viscosity of molten thermoplastic polymer, thereby increasing the wetting potential. This shear technique solved what had been an insurmountable problem with some high melt viscosity thermoplastic materials.

SUMMARY OF THE INVENTION

The present invention provides an apparatus for forming fiber filled thermoplastic composite materials which is capable of achieving a greater degree of wetting of fibers with thermoplastic materials, and wetting of fibers with thermoplastic materials of higher melt viscosities then have been usable heretofore. In accordance with the invention, continuous filamentary material is advanced through an impregnation chamber filled with polymer material and a shear inducing means is mounted in the impregnation chamber to cooperate with the filamentary material for imparting shear forces to the polymer material as it contacts the advancing filamentary material. More particularly, a shaft is mounted in the impregnation chamber which is capable of being rotated to cause rotational shearing of extruded molten thermoplastic polymer, which increases the successful impregnation and wetting of fibers with higher melt viscosity thermoplastic materials.

BRIEF DESCRIPTION OF THE DRAWINGS

Some of the features of the invention having been stated, others will become apparent as the description proceeds, when taken in connection with the accompanying drawings, in which:

FIG. 1 is a schematic perspective view of an apparatus in accordance with the present invention;

FIG. 2 is an enlarged scale, partly schematic, vertical section view through a portion of the apparatus of FIG. 1;

FIG. 3 is a schematic perspective view, similar to FIG. 1, showing a portion of an apparatus in accordance with an alternate embodiment of this invention wherein several filamentary strands are processed simultaneously;

FIG. 4 is a schematic perspective view similar to FIG. 3, but showing a portion of an apparatus in accordance with still another embodiment of this invention; and FIG. 5 is a perspective view showing a polymer-impregnated fiber material produced in accordance with the invention.

DETAILED DESCRIPTION OF INVENTION

While the present invention will be described more fully hereinafter with reference to the accompanying drawings, in which preferred embodiments of the present invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, an apparatus capable of producing the fiber filled thermoplastic composite materials of this invention is generally indicated at 10 in FIG. 1. The apparatus has fiber supply means, preferably in the form of a creel in which a plurality of packages 11 of fiber material are mounted for supplying continuous filament fiber material 12. The continuous filament fiber material 12 may be man-made continuous multi-filament fibers such as glass fiber, carbon fiber, metallic fiber, or any of the known synthetic fiber-forming polymers such as nylons, polyesters, polyolefins, polyaramids, and the like. Typically, such fibers are supplied by fiber producers in the form of a roving, tow or band, and may be more or less twisted depending upon the specific material and manner of handling prior to introduction into the processes of this invention. Desirably, the creel will deliver the fiber into the process of this invention with minimal twist, in order to provide the least possible interference with impregnation or enclosure of the fiber.

The fiber material 12 is advanced from the creel through a heating chamber 13 disposed along the predetermined path of fiber travel and the advancing fiber is preheated to a predetermined elevated temperature closer to the temperature of the molten flowing thermoplastic polymer in which the fiber will be immersed. In the embodiment illustrated, the heating chamber 13 takes the form of a chamber enclosing the fiber for contact with a heated gas, such as air. Alternatively, the heating chamber may employ other suitable heat sources, such as radiant heating. The preheated fiber is then advanced into and through an impregnation chamber 15 in which the fiber is thoroughly impregnated with a molten thermoplastic polymer material, as explained more fully below. A pair of cooperating pull rolls 16 on the downstream side of the impregnation chamber 15 engage the polymer-impregnated fiber and pull it from the supply packages 11, through the heater 13 and through the impregnation chamber 15. Although not shown, forced air or other cooling means may be applied to the fiber as it leaves the impregnation chamber 15 to facilitate cooling and hardening of the polymer. The polymer-impregnated fiber may thereafter be cut into predetermined lengths as desired by a cutter 18 and the cut lengths collected in a suitable receptacle 19.

As best seen in FIG. 2, the impregnation chamber 15 includes an elongate generally vertically extending impregnation passageway 20 with an open upper end 21 serving as an entrance end for the advancing fiber 12 and with a restricted die opening 22 at the lower end serving as the exit for the fiber. A polymer supply means, preferably in the form of an extruder 24, supplies molten, heated thermoplastic polymer to the impregnation passageway 20 through an entrance port 25 located adjacent the lower end of the passageway 20. The passageway 20 may be heated by appropriate means such as cartridge electric resistance heaters 26 embedded in the structure of the impregnation chamber 15. As indicated by the arrows, the molten polymer material flows generally upwardly through the impregnation chamber 20, counter-current to the downwardly advancing fiber 12. The molten polymer material is supplied to the impregnation passageway 20 by the extruder 24 at a rate generally corresponding to the rate that the polymer is applied to the fiber and leaves through the exit end. Thus, the molten polymer maintains a substantially constant level adjacent the upper end of the impregnation passageway.

As seen in FIGS. 1 and 2, an elongate shaft 30 is mounted to extend longitudinally into the impregnation passageway 20 from the upper end thereof. Two fibers 12 enter the open upper end 21 of the passageway and are directed downwardly through the passageway, passing over the surface of the shaft 30. The curved surface of the shaft induces the fiber to flatten out and the individual filaments thereof to spread apart to facilitate better wetting of the filaments by the polymer. The upper end of shaft 30 is connected to a motor 31 which is cabable of rotating the shaft generally coaxially within the elongate passageway. The apparatus may be operated with the shaft 30 either stationary or rotating, depending upon the particular type of product being produced, the desired degree of impregnation, the fiber composition, the nature and viscosity of the polymer material, and other factors. During operation, as the shaft 30 is rotated, the generally upwardly flowing polymer material is affected by the movement of the shaft 30. Rotation of the shaft causes the generally upwardly flowing polymer to follow the movement of the shaft somewhat, thus resulting in both a generally upward movement and in a circumferential movement. The circumferential or lateral component of the polymer movement, coupled with the downward sliding movement of the fiber, is believed to further assist in attaining good wetting or penetration by the polymer because of the contact angle of the polymer with the fiber. This tends to assist in mechanically working the molten polymer into intimate contact with each individual filament. Also, the rotational movement of the shaft 30 in contact with the molten polymer imparts shear to the polymer in the vicinity where it contacts the advancing fiber. Due to the shear-thinning rheological properties of molten thermoplastic polymers, this reduces the viscosity of the polymer in the immediate vicinity of the fiber, allowing for better wetting of each filament by the polymer and more thorough impregnation of the fibers.

At the foot of the impregnation passageway 20, the impregnated fiber is passed about a single turning guide or bar 38, and then passes generally horizontally, exiting from the apparatus through the restricted die opening 22. By appropriate selection of the diameter of the die opening, the ratio of polymer to fiber can be controlled as desired. Upon emerging from the impregnation chamber, the molten polymer-impregnated fiber may be cooled, either by natural ambient air cooling or by forced air, water or other suitable means.

A modified form of the invention is shown in FIG. 3. Since many of the elements in this embodiment correspond to those previously described in connection with FIGS. 1 and 2, corresponding elements will be identified using the same reference characters, with prime notation (') added. Basically, the impregnation chamber 15' in accordance with this embodiment differs over that in FIGS. 1 and 2 only in that it is constructed to have a plurality of side-by-side spaced apart impregnation chambers 20' each adapted for receiving and processing continuous filament fiber 12' therethrough. In this embodiment, each shaft 30' is equipped at its upper end with a gear 41 and the rotating shaft of the motor 31' is equipped with a cooperating worm gear 42 adapted for simultaneously driving all of the shafts 30' in simultaneous rotation. It will be seen that the fiber 12' from each passageway 20' passes around the turning bar 38' and emerges from the impregnation chamber through a respective individual restricted passageway 22'.

FIG. 4 shows still another embodiment of the present invention. The embodiment of FIG. 4 is similar in most respects to that previously described in connection with FIG. 3. Accordingly, elements which correspond to elements previously described in connection with FIG. 3 will be identified by the same reference character, with double prime (") notation added. Basically, the embodiment of FIG. 4 differs over that of FIG. 3 in that the respective impregnated fibers are combined in the impregnation chamber 15" and emerge from a single restricted die opening 22". This allows for the production of much larger and heavier strand of material. At the foot of the respective impregnation columns 20", the fibers are passed about a single turning guide 38". Thereafter, the fibers travel generally horizontally and gradually converge as they enter the restricted die opening 22". Additional strand guides 45 are provided for guiding the individual strands of fiber material into converging relation. As the fibers converge upon entering the restricted die opening, thermoplastic polymer material is drawn into the space between the strands and then the thermoplastic material is squeezed into intimate contact with the fibers, thus further assisting and assuring the wetting of the fibers with the thermoplastic material. This arrangement enables the production of products with much higher fiber content.

The fiber material supplied may be a multifilament strand. In the instance where glass is the fiber supplied, a typical roving, tow or band is one which contains about 2,000 filaments and yields 432 yards per pound. With such fiber, the density is about 2.54 grams/cubic centimeter, and filament diameter is in the range from about 12 to about 16 microns. Aramid rovings, which typically have a density of about 1.44 gm/cc, may yield 2,000 yards per pound. Suitable carbon fiber may yield 575 yards per pound with a density of about 1.75 grams/cubic centimeter and 12,000 filaments. Suitable stainless steel fiber may have 10,000 filaments with an 8 micron diameter and a density of 8.02 grams/cubic centimeter, yielding 380 yards per pound. In the process, the filaments of the fiber used are oriented to be parallel, and the fiber is spread into a flat web. The process is such that it includes individually embedding each of a plurality of multifilaments in the selected thermoplastic material. As used in this description, the term "continuous filament" means any fibrous material having filaments at lengths greater than twenty feet or six meters.

In accordance with the important characteristics of this invention, the rotation shear amplified wetting technology of the impregnation column 15" enable the use of thermoplastic materials having much higher melt viscosities than have been practical. Thus the present invention opens the possibility of impregnating fibers of the types described with polybutylene terephthalate, polyethylene terephthalate, polyurethane, polyamide, polypropylene, polyoxymethylene polyacetal), polycarbonate, liquid crystal polymer (aromatic copolymer), polyphenylene sulfide, high density polyethylene, polyvinylchloride, polyetherimide, polyethersulfone, polyarylsulfone (PAS), polyetherketone (PEK), polyetheretherketone (PEEK), polyetherketoneketone (PEKK), and polyphthalamide.

As will be understood by persons of appropriate skill in the technologies associated with forming thermoplastic materials, the melt viscosity of a polymer is a function of the shear rate to which the material is subjected, shear stress, temperature, molecular weight and concentration of any additives. Generally speaking a lower viscosity will impregnate or wet a fiber bundle better than a higher viscosity polymer. Wetting may also be influenced by surface tension, with polar molecules (having a higher surface energy which equates with a higher surface tension) wetting better than non-polar molecules. Additives may include internal lubricants to reduce melt viscosity and external lubricants to influence the surface polarity of the fiber.

Viscosity in units of poise, as used herein, refers to a function of temperature at extrusion and shear rate to which the thermoplastic material is subjected while at the temperature stated. Temperature at extrusion is here called "stock temperature". Viscosities, for purposes of this description, are defined at a stock temperature and a shear rate of one hundred inverse seconds. That is, as shear rates are a function of a volume rate of flow divided by a volume, the resulting unit is second(s)$^{-1}$, or inverse seconds In tabular form, the values for certain of the thermoplastic materials contemplated for use in this invention are as follows:

| Material | Stock Temp. (°F.) | Viscosity (poise) |
|---|---|---|
| Polybutylene terephthalate (PBT) | 540 | 250 |
| Polyester terephthalate (PET) | 580 | 460 |
| Polyurethane (PU) | 500 | 460 |
| Polyamide (PA) | 580 | 520 |
| Polypropylene (PP) | 540 | 1,000 |
| Polyoxymethylene (POM) | 475 | 1,380 |
| Polycarbonate (PC) | 600 | 2,000 |
| Liquid crystal polymer (LCP) | 590 | 3,000 |
| Polyphenylene sulfide (PPS) | 630 | 4,000 |
| High density polyethylene (HDPE) | 550 | 5,400 |
| Polyvinlychloride (PVC) | 400 | 20,000–200,000 |

As will be clear at this point in the disclosure of this invention, the fiber and thermoplastic material are brought into intimate engagement with the impregnation column 15, 15' or 15". Certain characteristics of that portion of the apparatus, and the process steps which occur therewithin, have been discussed. Attention will now be turned to other information valuable in appreciating the products produced in accordance with this invention. As will be appreciated, the geometry of the impregnation column is such as to maintain sufficient pressure on the materials passing therethrough to accomplish the result desired. Thus the opening in the final die through which the composite product passes from the impregnation column is such as to control the polymer to fiber ratio in the final product and the shape of the cross section of the product. The ratio of polymer to fiber may be in the range of from about 0.25 to about 4.0 to 1.0. The shape may be whatever is desired, within reasonable limits, and will usually be a round cross section (FIG. 5) where pellets are being formed for subsequent extrusion, a rectangular cross section where pre-impregnated ribbons or tapes (herein called "prepregs") are being formed for later build-up fabrication, and any desired cross section (such as that of an I beam) where structural members are being formed directly. In use of an apparatus constructed and operated in accordance with this invention, a slight swelling of the product issuing from the die is noticed when optimal products are being produced, thus indicating that the flow of thermoplastic material from the die is partly due to pressure (extrusion) and partly due to entrainment with the moving fiber (pultrusion). Due to the short residence time in the column, the operating temperature of the column may be up to fifty degrees Fahrenheit higher than the normal processing temperature of the thermoplastic material used. In such event, volatile components of the thermoplastic material may be driven off in the column, and rise to pre-impregnate the downwardly moving fibers.

The products produced in accordance with this invention may be of at least three general types—here referred to as pellets, prepregs, and profiles. The products share the characteristics of having a group of elongate filamentary fibers each extending longitudinally generally parallel to and free of entanglement with other fibers in the group, and a body of thermoplastic material impregnating and enclosing the group of fibers and maintaining individual fibers in the group separate from and extending longitudinally generally parallel to and free of entanglement with other fibers in the group. The specific product produced depends in part on the selection of the forming die, as being circular in cross section, rectangular, or specially formed.

Where the product to be produced is to be a pellet for subsequent use in extrusion of products to be formed of composite materials, then the preferred cross section is circular. Material exiting the column 15 is delivered to a cooling area where it may be impinged upon by flowing cooling air, then passed through a pulling station 16 and advanced to a cutter 18 which chops or cuts the advancing, essentially infinitely long, product into desired short lengths. Typically, a pellet will be a body of material having a generally circular cross sectional configuration and a length greater than twice the diameter of the cross sectional diameter of the body, with reinforcing fibers extending through the body. The reinforcing fibers in such a pellet have essentially the same length as the pellet and may, in accordance with this invention, be substantially more closely packed than has been the case heretofore. More specifically, where the fiber is glass, the number of individual fibers may be in the range of from about 2,000 to about 32,000, and the percentage of fiber by weight of the pellet may be as high as eighty percent.

Prepregs are typically delivered to a compressed air or liquid cooled drum or roller, and packaged by winding. Prepregs may have widths in a range of from a fraction of an inch to several inches, and thicknesses in a range of from about 0.010 to about 0.030 inch.

Profiles are handled similarly to pellets, with the exception that the length and cross section design are usually determined from the intended application. Examples of cross sectional designs may be various rod, channel or I beam forms as known generally from the manufacture of other materials such as steel.

In the drawings and specifications there has been set forth a preferred embodiment of the invention and, although specific terms are used, the description thus given uses terminology in a generic and descriptive sense only and not for purposes of limitation.

That which I claim:

1. Apparatus for producing a fiber reinforced composite material comprising an impregnation chamber having an elongate impregnation passageway with an entrance end and an exit end, an extruder for providing a supply of molten thermoplastic polymer material, means for directing polymer material from said extruder to said impregnation chamber, means for advancing continuous filament fibers into and through said impregnation chamber, entering through said entrance end and exiting through said exit end, so that the fibers are immersed in said polymer material, shear inducing means mounted in said impregnation chamber and cooperating with said fibers, said shear inducing means including means mounted for movement in said chamber in contact with the advancing fibers and the polymer material for imparting shear to the polymer material as it contacts the advancing fibers to enhance the wetting and impregnation of the fibers by the polymer material and means on the downstream side of said impregnation chamber for pulling the polymer impregnated fibers from the impregnation chamber and through said exit end thereof.

2. The apparatus according to claim 1, wherein said means mounted for movement in said impregnation chamber comprises a rotatably mounted element.

3. The apparatus according to claim 1, wherein said shear inducing means comprises an elongate shaft extending longitudinally within said impregnation chamber, and means for rotating said shaft while in contact with the advancing fibers and the polymer material.

4. The apparatus according to claim 1, wherein said means for directing polymer material to said impregnation chamber is arranged to direct the polymer material to flow through the impregnation chamber in a direction countercurrent to the movement of the advancing fibers.

5. Apparatus for producing a fiber reinforced thermoplastic material comprising an impregnation chamber having an elongate impregnation passageway with an entrance end and an exit end, an exit die with a restricted die opening mounted at the exit end of said impregnation passageway, a supply of continuous filament fibers, means for directing the fibers along a predetermined advancing path of travel into and through said impregnation passageway, entering through said entrance end and exiting through the restricted die opening of said exit die, an extruder for providing a supply of molten, thermoplastic polymer under pressure, means for directing molten thermoplastic polymer from said extruder into said impregnation passageway at a location adjacent said exit end thereof so that the molten polymer flows along the passageway toward said entrance end thereof in countercurrent relation to the direction of movement of the advancing fibers, a shaft positioned in said impregnation passageway for contact by the advancing fibers to enhance wetting and impregnation of the fibers, and means on the downstream side of said impregnation chamber for pulling the polymer impregnated fibers from the impregnation chamber and through said exit die.

6. The apparatus according to claim 5, wherein said shaft is mounted for rotation in said passageway for imparting shear to the molten thermoplastic polymer as it contacts the advancing fibers.

7. Apparatus for producing a fiber reinforced thermoplastic material comprising an impregnation chamber having a vertically oriented, elongate impregnation passageway with an upper entrance end and a lower exit end, an exit die with a restricted die opening mounted at the lower exit end of the impregnation passageway, a supply of continuous filament fibers, means for directing the fibers along a predetermined advancing path of travel into and through said impregnation passageway, entering through said entrance end and exiting through the restricted die opening of said exit die, an extruder for providing a supply of molten, thermoplastic polymer under pressure, means for directing molten thermoplastic polymer from said extruder into said impregnation passageway at a location adjacent said exit end thereof so that the molten polymer flows upward in countercurrent relation to the direction of the advancing fiber and in intimate contact with the advancing fiber, a shear inducing element mounted in said impregnation chamber and cooperating with said fibers for imparting shear to the molten polymer as it contacts the advancing fibers to enhance the wetting and impregnation of the fibers by the molten polymer, and means on the downstream side of said impregnation chamber for pulling the polymer impregnated fibers from the impregnation chamber and through said exit die.

* * * * *